(12) United States Patent
Kim et al.

(10) Patent No.: US 12,186,951 B2
(45) Date of Patent: Jan. 7, 2025

(54) APPARATUS FOR MOLDING

(71) Applicant: LG Electronics Inc., Seoul (KR)

(72) Inventors: Dongcheol Kim, Seoul (KR);
Sanghwon Jung, Seoul (KR);
Youngjong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 673 days.

(21) Appl. No.: 17/407,625

(22) Filed: Aug. 20, 2021

(65) Prior Publication Data
US 2022/0063160 A1 Mar. 3, 2022

(30) Foreign Application Priority Data
Aug. 26, 2020 (KR) .......... 10-2020-0107913

(51) Int. Cl.
*B29C 45/26* (2006.01)
(52) U.S. Cl.
CPC .......... *B29C 45/2618* (2013.01); *B29C 45/26* (2013.01); *B29C 45/2606* (2013.01)
(58) Field of Classification Search
CPC ......... B29C 45/2618; B29C 2043/3684; D06F 13/02
See application file for complete search history.

(56) References Cited

U.S. PATENT DOCUMENTS

| | | | | |
|---|---|---|---|---|
| 4,243,199 A * | 1/1981 | Hill | ......................... | B29C 39/34 249/142 |
| 4,858,450 A * | 8/1989 | Noh | ......................... | D06F 13/02 68/134 |
| 6,123,539 A * | 9/2000 | Miller | ..................... | B29C 45/33 425/441 |
| 2003/0198556 A1 * | 10/2003 | Kim | ..................... | F04D 29/023 416/182 |
| 2005/0284196 A1 * | 12/2005 | Kopyrin | ................. | D06F 13/02 68/133 |
| 2012/0057986 A1 * | 3/2012 | Inoue | .................... | F04D 29/023 264/645 |

* cited by examiner

*Primary Examiner* — Alison L Hindenlang
*Assistant Examiner* — Virak Nguon
(74) *Attorney, Agent, or Firm* — Fish & Richardson P.C.

(57) ABSTRACT

An apparatus for molding a rotating member includes a main mold including a column part space configured to mold a column part therein, a plurality of blade spaces configured to mold a plurality of blades therein, and a plurality of split bodies disposed along a circumferential direction of the column part and configured to move along a radial direction of the column part. Each of the plurality of split bodies comprises a column part molding surface defining the column part space, and a plurality of blade molding surfaces defining the blade space. Column part molding surfaces of the plurality of the split bodies define the column part space together, and a first blade molding surface provided at one of the plurality of split bodies defines, together with a second blade molding surface provided at another one of the plurality of split bodies, one of the plurality of blade spaces.

18 Claims, 7 Drawing Sheets

APPARATUS FOR MOLDING

CROSS-REFERENCE TO RELATED APPLICATIONS

Pursuant to 35 U.S.C. § 119(a), this application claims the benefit of earlier filing date and right of priority to Korean Application No. 10-2020-0107913, filed on Aug. 26, 2020, the contents of which are hereby incorporated by reference herein in their entirety.

TECHNICAL FIELD

The present disclosure relates to an apparatus for molding, and more particularly, to a molding apparatus for performing injection molding on a single rotating member in a plurality of molds separated from each other.

BACKGROUND

Injection molding is a manufacturing process for making several products by injecting dissolved substances (hereinafter referred to as injection liquid) into a mold. Specifically, injection molding refers to a molding method of processing a molded product in a manner of injecting injection liquid dissolved by heating into a mold and then solidifying or hardening the injection liquid.

The injection molding process schematically includes total five steps to progress.

Specifically, the injection molding process consists of a first step of preparing a space for solidifying or hardening injection liquid within a mold by coupling a fixed mold and a moving mold together, a second step of injecting the injection liquid into the space, a third step of continuously injecting the injection liquid by maintaining a predetermined pressure of a nozzle to supplement a space whose volume contracts due to the cooling liquid in the mold, a fourth step of solidifying or hardening the injection liquid in the mole, and a fifth step of extracting a solidified or hardened injection product out of the mold by opening the moving mold.

In the fifth step, an extraction pin is installed inside the fixed mold to extract the injection product from the mold. When the mold is opened, the extraction pin pushes out the injection product to remove.

Meanwhile, in case that an undercut shape projected in a direction inclined to an extraction direction is provided to a surface of an injection product, a separate rotating shaft is included. As the rotating shaft rotated, the injection product is pushed out to be extracted rotationally.

However, in such a case, a rotational power generator such as a separate motor and the like should be provided to a molding device. As a result, the molding device becomes excessively complicated. Thus, it is difficult to design and manufacture a molding device. Moreover, vibration, noise and the like may be generated excessively. Furthermore, the number of cores essential to mold an injection product is increased.

On the other hand, in the molding device of the related art, the proportion of an undercut shape in the entire injection product may be increased, resulting in excessive parting lines on a surface of the injection product. The parting lines may show poor aesthetics, cause fabric damage when rotating. The sharp parting lines may reduce user's convenience when the user uses the injection product.

Accordingly, a cast is formed by coupling a plurality of split moving molds together instead of the rotational extraction system in the fifth step among the injection molding steps. And, one significant task in the present technical field is to design a molding apparatus capable of extracting an injection product from the cast by separating a plurality of the moving molds without rotating the injection product.

In addition, another significant task in the present technical field is to design a molding apparatus capable of decreasing the number of parting lines excessively occurring in the conventional injection product extraction system.

SUMMARY

Accordingly, embodiments of the present disclosure are directed to an apparatus for molding that substantially obviates one or more problems due to limitations and disadvantages of the related art.

One object of the present disclosure is to provide a molding apparatus including a main mold part including split bodies divided along a circumferential direction.

Another object of the present disclosure is to provide a molding apparatus capable of extracting a rotating member molded within a main mold part by injection molding in a manner of separating the respective split bodies from each other.

Another object of the present disclosure is to provide a molding apparatus capable of molding at least one blade by each molding face of a plurality of split bodies.

Another object of the present disclosure is to provide a molding apparatus capable of extracting a rotating member in a manner that a plurality of split bodies slide in a radial direction of a column part of the rotating member, thereby improving productivity and maintenance facilitation.

Further object of the present disclosure is to provide a molding apparatus capable of molding a rotating member provided with a blade under 1-turn.

Technical tasks obtainable from the present disclosure are non-limited by the above-mentioned technical tasks. And, other unmentioned technical tasks can be clearly understood from the following description by those having ordinary skill in the technical field to which the present disclosure pertains.

Additional advantages, objects, and features of the disclosure will be set forth in the disclosure herein as well as the accompanying drawings. Such aspects may also be appreciated by those skilled in the art based on the disclosure herein.

To achieve these objects and other advantages and in accordance with the purpose of the disclosure, as embodied and broadly described herein, an apparatus for molding according to one embodiment of the present disclosure may include a main mold including a plurality of split bodies molding a rotating member.

To achieve these objects and other advantages and in accordance with the purpose of the disclosure, as embodied and broadly described herein, an apparatus for molding a rotating member including a column part and a plurality of blades according to one embodiment of the present disclosure is provided.

Specifically, the column part may be extended from one end portion toward the other end portion and the blade may be provided to an outer circumferential surface of the column part and extended by being inclined to one direction of a circumferential direction of the column part The apparatus may include a main mold including a column part space having the column part molded therein and a plurality of blade spaces having the blades molded therein.

The main mold may include a plurality of split bodies disposed along the circumferential direction of the column part and configured movable along a radial direction of the column part.

The split body may include a column part molding space and a blade molding side. The column part molding side may form a portion of the column part space, a plurality of the blade molding sides may be configured and form a portion of the blade space.

A plurality of the split bodies may form the column part space with the respective column part molding sides and the blade molding side provided to one of the split bodies may form a prescribed blade space together with the blade molding side provided to another one of the split bodies.

In the molding apparatus according to one embodiment of the present disclosure, the number of a plurality of the split bodies may be set to the number corresponding to the number of the blade spaces and each of the split bodies may be movable in a radial direction of the column part.

A plurality of the split bodies may include a first split body, a second split body located to neighbor the first split body in the one direction, and a third split body located to neighbor the first split body in the other direction opposite to the one direction.

A plurality of the blade spaces may include a first blade space and the first lade space may be formed by the first split boy, the second split body and the third split body.

The column molding side may include a first column molding side and a second column molding side. The first column molding side may form the other end portion of the column part space for molding the other end portion of the column part therein.

The second column molding side may form one end portion of the column part space for molding the one end portion of the column part therein. The blade space may include one end portion for molding one end portion of the blade therein and the other end portion molding the other end portion of the blade therein.

The blade molding side may include a first molding side and a second molding side. The first molding side may be extended from the first column molding side toward the one direction and the second molding side may be extended from the first column molding side toward the other direction.

The first molding side of the first split body may form the other end portion of the first blade space together with the second molding side of the second split body.

The blade molding side may include a third molding side and a fourth molding side. The third molding side may be extended from the second column molding side toward the other direction and the fourth molding side may be extended from the second column molding side toward the one direction.

The third molding side of the first split body may form one end portion of the first blade space together with the fourth molding side of the third split body.

The first molding side of the first split body may form one side of a prescribed blade together with the fourth molding side of the third split body and the third molding side of the first split body may mold the other side of the prescribed blade together with the second molding side of the second split body.

The split body may include a first receiving part and a first inserting part. The first receiving part may be recessed inward by including the first molding side and the first inserting part may protrude outward by including the second molding side. The first inserting part of the second split body may form the other end portion of the first blade space by being inserted in the first receiving part of the first split body.

The split body may include a second receiving part and a second inserting part. The second receiving part may be recessed inward by including the third molding side and the second inserting part may protrude outward by including the fourth molding side.

The second inserting part of the third split body may form the one end portion of the first blade space by being inserted in the second receiving part of the first split body.

The molding apparatus according to one embodiment of the present disclosure may include a shield mold connected to the split body on the other end portion side of the column part to shield the column part space.

The shield mold may include a hollow molding pin inserted into the column part to mold the column part into a hollow shape. The shield mold may include a guide recess formed on one side confronting the split body in the shield mold and configured to be extended in a direction getting distant from the hollow molding pin and enable at least one portion of the split body to be slidably received therein.

In the molding apparatus according to one embodiment of the present disclosure, the rotating member may include a bottom part connected to the one end portion of the column part and having a diameter greater than that of the column part The split body may include a bottom molding space formed on the bottom part side and configured to communicate with the column part space and mold the bottom part.

The split body may be configured to communicate externally by opening one side of the bottom molding space and the molding apparatus according to one embodiment of the present disclosure may include a pressurizing mold shielding the one side of the bottom molding space by being coupled to the main mold and including an inlet part enabling an injection liquid to be injected into the bottom molding space.

Each feature of the above-described embodiments can be combined in other embodiments unless it is contradictory or exclusive to other embodiments.

Accordingly, the present disclosure provides the following effects and/or advantages.

First of all, embodiments of the present disclosure provide a molding apparatus including a main mold part including split bodies split along a circumferential direction.

Secondly, embodiments of the present disclosure provide a molding apparatus capable of extracting a rotating member molded within a main mold part by injection molding in a manner of separating the respective split bodies from each other.

Thirdly, embodiments of the present disclosure provide a molding apparatus capable of molding at least one blade by each molding face of a plurality of split bodies, thereby providing a dynamic blade.

Fourthly, embodiments of the present disclosure provide a molding apparatus capable of extracting a rotating member in a manner that a plurality of split bodies slide in a radial direction of a column part of the rotating member, thereby improving productivity and maintenance facilitation.

Fifthly, embodiments of the present disclosure provide a molding apparatus capable of molding a rotating member provided with a blade under 1-turn.

Effects obtainable from the present disclosure may be non-limited by the above-mentioned effects. And, other unmentioned effects can be clearly understood from the following description by those having ordinary skill in the technical field to which the present disclosure pertains.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. The above and other aspects, features, and advantages of the present disclosure will become more apparent upon consideration of the following description of preferred embodiments, taken in conjunction with the accompanying drawing figures.

DETAILED DESCRIPTION

Reference will now be made in detail to the preferred embodiments of the present disclosure, examples of which are illustrated in the accompanying drawings. In this specification, the same or similar reference numbers shall be assigned to the same or similar configurations even in different embodiments, and the description thereof shall be replaced with the first description. The singular representations used in this specification include plural representations unless explicitly meant otherwise in the context. In explaining embodiments of the present disclosure, if it is deemed that a specific description of the prior art related to the present disclosure may unnecessarily blur the gist of the present disclosure, the detailed description shall be omitted. It should also be noted that the accompanying drawings are intended to facilitate understanding of the embodiments disclosed in this specification and should not be construed as limiting the technical ideas disclosed in this specification by the accompanying drawings.

The terms described below are those defined in consideration of their functions in the present disclosure, which may depend on the intentions or practices of the user, operator, etc. The definition will therefore have to be based on the full text of the present specification. The terms used in the detailed description are simply to describe embodiments of the present disclosure and should never be limited.

In this description, an expression such as "include" or "provide" is intended to refer to some characteristics, numbers, steps, operations, elements, or combinations thereof, and should not be interpreted to exclude the existence or possibility of one or more other characteristics, numbers, steps, operations, elements, or combinations thereof.

In addition, terms such as first, second, A, B, (a), (b) and the like may be used to describe the components of the embodiments of the present disclosure. These terms are intended to distinguish the component from other components, but non-limit the nature, turn, order or the like of the component.

Figure 1:
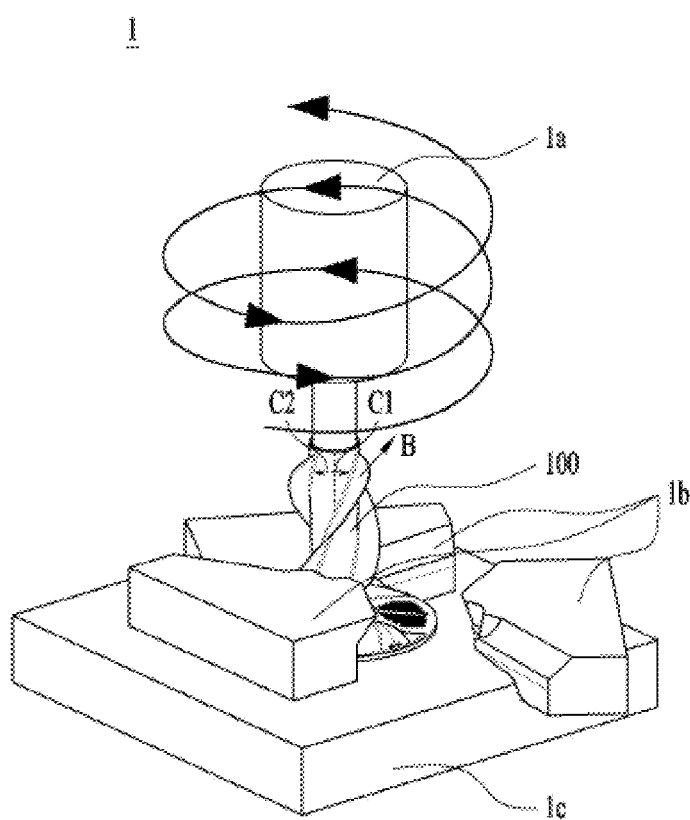
FIG. 1 is a perspective diagram showing a molding apparatus according to one embodiment of the present disclosure.

FIG. 1 is a perspective diagram showing a molding apparatus according to one embodiment of the present disclosure.

Referring to FIG. 1, a molding apparatus may include a column mold 1b, a bottom mold 1c and an extracting part 1a. The molding apparatus 1 may form a rotating member 100 by injection molding and rotate to extract it.

In case that an undercut shape having an inclination direction B is provided to an outer circumferential surface of the rotating member 100, even if the column mold 1b moves in a radial direction of the rotating member 100, the extracting part 1a rotates along the inclination direction B in the undercut shape so as to extract the rotating member 100 from the molding apparatus 1.

In this case, a separate rotational power generator is required for the rotation of the extracting part 1a, which may affect productivity and costs disadvantageously. In addition, a flash or step difference is generated from a surface of the rotating member 100, which may degrade a quality of the rotating member 100.

Figure 2:
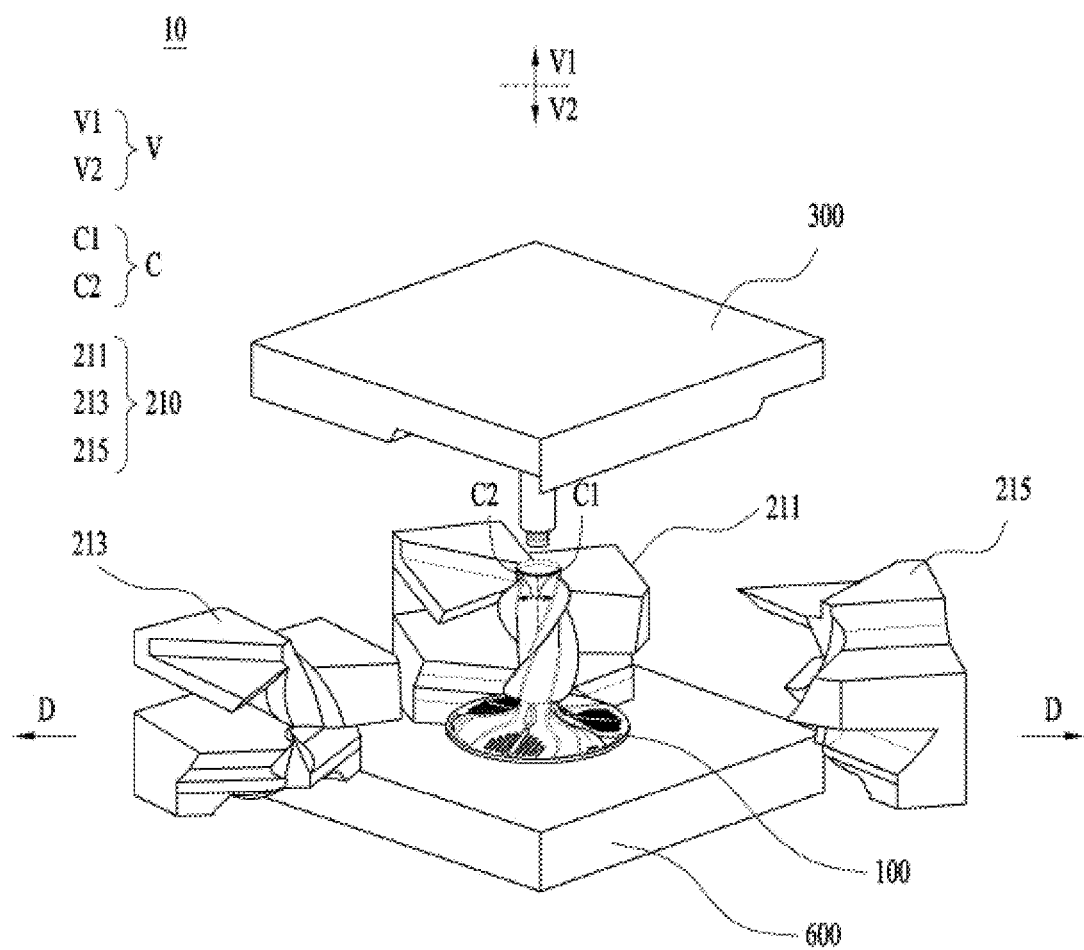
FIG. 2 is a perspective diagram showing a molding apparatus including split bodies according to one embodiment of the present disclosure.
Figure 3:
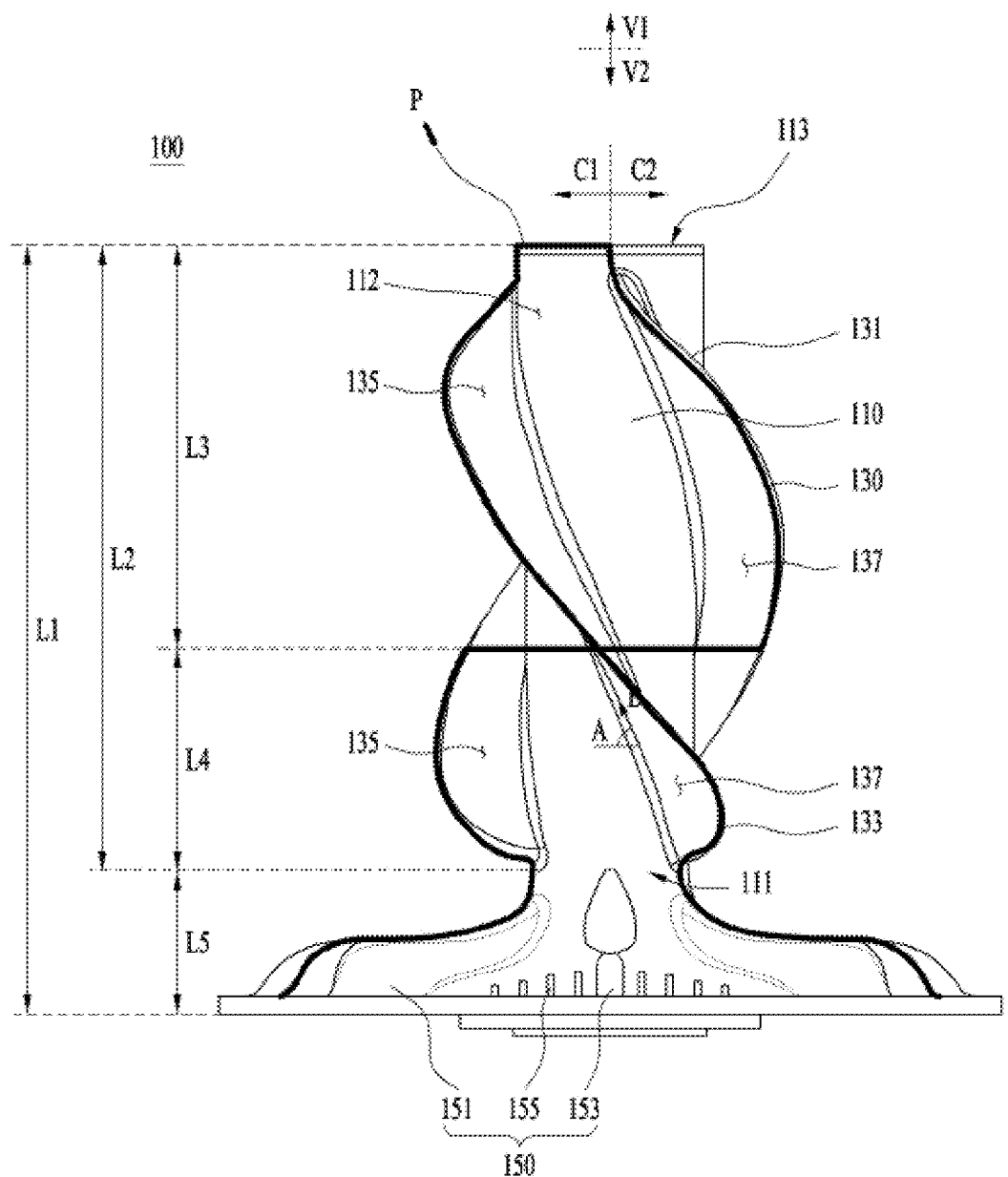
FIG. 3 is a side-view diagram showing a rotating member molded by a molding apparatus according to one embodiment of the present disclosure.

FIG. 2 is a perspective diagram showing a molding apparatus including split bodies according to one embodiment of the present disclosure. FIG. 3 is a side-view diagram showing a rotating member molded by a molding apparatus according to one embodiment of the present disclosure.

Referring to FIG. 2, a molding apparatus 10 according to one embodiment of the present disclosure may include a main mold 200 and a plurality of split bodies 211, 213 and 215 disposed along a circumferential direction C of a column part 100 of a rotating member 100, which will be described later, so as to move along a radial direction D of the column part 110.

The molding apparatus 10 according to one embodiment of the present disclosure may include a shield mold 300 located in a first direction V1 of the main mold 200 so as to shield a column part space S1 in which the column part 110 is molded.

The first direction V1 may be defined as a direction in which the column part 110 is extended from one end portion 111 toward the other end portion 113.

In addition, the molding apparatus 10 according to one embodiment of the present disclosure may include a pressurizing mold 600 located in a second direction V2 confronting the first direction V1 in the main mold 200 so as to shield a bottom molding space S3 in which a bottom part 150 of a rotating member 100 described later is molded.

Namely, the second direction V2 may be defined as a direction opposed to the first direction V1 in which the column part 110 is extended from the one end portion 111 toward the other end portion 113 or a direction heading for the one end portion 111 of the column part 110 from the other end portion 113.

In addition, each of the first direction V1 and the second direction V2 may correspond to a length direction V formed by the column part 110.

The main mold 200 is provided between the shield mold 300 and the pressurizing mold 600, thereby forming a space for molding the rotating member 100.

In some implementations, referring to FIG. 3, the rotating member 100 may include a column part 110, a blade 130 and a bottom part 150.

Specifically, the column part 110 may be extended from one end portion 111 toward the other end portion 113. Namely, the column part 110 may be extended from one end portion 111 in the first direction V1 toward the other end portion 113. Moreover, as described later, the column part 110 may be configured in a hollow shape.

The blade 130 may be configured in a manner of being projected from an outer circumferential surface 112 of the column part 110 in a radial direction D of the column part 110. In some cases, the blade 130 may be extended to become distant from a center of the column part 110 by forming the curvature with the outer circumferential surface 112 of the column part 110.

The blade 130 forms an inclination to the first direction V1 and may be extended from the one end portion 111 of the column part 110 toward the other end portion 113.

So to speak, the blade 130 forms an inclination to one direction C1 of the circumferential direction C of the column part 110 and may be provided to the outer circumferential surface 112 of the column part 110.

As shown in FIG. 3, when the column part 110 is viewed from the other end portion 113 of the column part 110, one direction C1 of the circumferential direction C of the column part 110 may correspond to a clockwise direction of the circumferential direction C of the column part 110.

On the contrary, when the column part 110 is viewed from the other end portion 113 of the column part 110, the other direction C2 of the circumferential direction C of the column part 110 may correspond to a counterclockwise direction of the circumferential direction C of the column part 110.

Meanwhile, an inclination A formed by the blade 130 may be maintained uniformly and provided in screw shape to the column part 110. Moreover, a plurality of the blades 130 may be provided, disposed along the circumferential direction C of the column part 110 in a manner of being spaced apart from each other, and extended in a manner of being inclined to the first direction V1.

One end portion 131 of the blade 130 may face the second direction V2, the other end portion 133 may face the first direction V1, the blade 130 may be inclined in the one direction C1 of the circumferential direction of the column part 110 to the length direction V of the column part 110, and the blade 130 may be extended to the other end portion 133 from the one end portion 131.

Namely, the blade 130 may be extended in a manner that an extension direction B forms an acute angle to the one direction C1 and that the extension direction B forms an obtuse angle to the other direction C2.

A plurality of the blades 130 may be extended from the one end portion 131 to the other end portion 133 in a manner that each spaced distance in between is maintained uniformly based on the circumferential direction C of the column part 110.

Regarding the blade 130, at least one portion of one side 135 may face the first direction V1 and at least one portion of the other side 137 provided to an opposite side of the one side 135 may face the second direction V2. When the blade 130 is viewed from the other end portion 113 of the column part 110 toward the second direction V2, the one side 135 and the other side 137 may form an obtuse angle and an acute angle to the outer circumferential surface 112 of the column part 110, respectively.

In some implementations, according to one embodiment of the present disclosure, the blade 130 may be configured in a manner that a height L2 from the one end portion 131 to the other end portion 133 may be set equal to or greater than ½ of an overall height L1 of the rotating member 100 based on the length direction V of the column part 110.

As shown in FIG. 3, the height L2 from the one end portion 131 of the blade 130 to the other end portion 133 may be defined as a vertical distance to a top side of the bottom part 150. The height L2 from the one end portion 131 of the blade 130 to the other end portion 133 may be defined as a height of the blade 130.

The height L2 of the blade 130 may be determined in consideration of an ascending amount of a current, an inclination angle A of the blade 130, a diameter of the column part 110, etc.

For example, the lower the height L2 of the blade 130 gets, the smaller an area having the blade 130 formed therein becomes. Moreover, the ascending amount of the current and the descending amount of the current may decrease.

According to one embodiment of the present disclosure, the blade 130 may form an ascending current and a descending current, which are valid when the column part 110 rotates. If the height L2 of the blade 130 is smaller than ½ of the length L1 of the rotating member 100, it may be difficult for the current formation by the blade 130 to work validly.

In some implementations, the bottom part 150 may be configured to have a diameter greater than that of the column part 110 in a manner of being connected to the one end portion 111 of the column part 110. A cross-section of the bottom part 150 may have a circular shape. A center of the bottom part 150 may be aligned with a center of the column part 110. The column part 110 may have a circular cross-section and be configured in a shape protruding from the bottom part 150.

The bottom part 150 may be extended along a radial direction of the bottom part 150 by protruding from the bottom part 150 toward the second direction V2 opposite to the first direction V1. A plurality of the bottom parts 150 may be provided and disposed along a circumferential direction of the bottom part 150 in a manner of being spaced apart from each other.

The protrusion part may include a plurality of main protrusion parts 151 connected to the column part 110 and a first sub-protrusion part 153 provided to each space between the main protrusion parts 151. In this case, a protrusion height of the first sub-protrusion part 153 from the bottom part 150 toward the other direction V2 may be lower than the main protrusion part 151.

The protrusion part may include a second sub-protrusion part 155 provided to each space between the main protrusion part 151 and the first sub-protrusion part 153. In this case, a protrusion height of the second sub-protrusion part 153 from the bottom part 150 may be lower than the first sub-protrusion part 153.

Meanwhile, the rotating member 100 may be provided for various usages. For example, the rotating member 100 may be provided within a laundry treatment device for washing laundry. The laundry treatment device may include a tub storing water therein and a drum provided within the tub to store laundry therein. The rotating member 100 may be provided within the drum so as to form a current by being rotated.

Specifically, the rotating member 100 may be configured rotatable separately from the drum in a manner that the bottom part 150 is disposed on a bottom side of the drum. The column part 110 may be rotated by being extended from the bottom part 150 toward an open side of the drum.

Once the column part 110 is rotated, a current may be formed in the water existing in the drum by the blade 130. A mixing rate between clothes, i.e., laundry and detergent is improved by the current and a frictional force working on the laundry is increased, whereby washing efficiency may be effectively improved.

In some implementations, as the blade 130 is extended in a manner of being inclined to the length direction V of the column part 110, when the drum is rotated, the blade 130 may form an ascending current for enabling water in the drum to flow upward or a descending current for enabling the water to flow downward. The rotating member 100 molded via the molding apparatus 10 according to one embodiment of the present disclosure may form 3D fluid flow on rotation.

The rotating member 100 may be provided not only to the laundry treatment device but also to any devices that require the rotating member 100 in the shape including the blade 130 inclined on the column part 110 extended from the one end portion 111 to the other end portion 113.

For example, the rotating member 100 may include a gear (e.g., a worm gear) having a screw-shaped thread, be configured to make gas flow via rotation, and be available for other various usages.

In some implementations, referring to FIG. 2 again, the molding apparatus 10 according to one embodiment of the present disclosure molds the rotating member 100 including the column part 110 extended from the one end portion 111 toward the other end portion 113 and a plurality of the blades 130 provided to the outer circumferential surface of the column part 110 and extended in a manner of being inclined to the one direction C1 of the circumferential direction C of the column part 110.

Namely, the molding apparatus 10 according to one embodiment of the present disclosure may mold the rotating member 100 shown in FIG. 3 inside and extract the rotating member 100, of which injection molding is completed.

The main mold 200 may include a column part space S1 for molding the column part 110 therein, a plurality of blade spaces S2 for molding the blade 130 therein, and a bottom molding space S3 for molding the bottom part 150 by communicating with the column part space S1.

The column part space S1 may be configured in width or length so that an injection liquid can flow into the main mold 200 to mold the column part 110. The number of the blade space(s) S2 may be set equal to that of the blade(s) 130.

The blade space S2 may be provided inside the main mold 200 in a manner of being engraved in a direction getting distant from the column part space S1 in the main mold 200 to correspond to the width or length of the blade 130. And, the blade space S2 may be configured to communicate with the column part space S1.

Meanwhile, the main mold 200 may include a plurality of split bodies 211, 213 and 215 disposed along the circumferential direction C of the column part 110 and configured movable along the radial direction D of the column part 110. The number of a plurality of the split bodies 211, 213 and 215 may be set equal to that of the blade spaces.

For example, as shown in FIG. 2, the number of a plurality of the split bodies 211, 213 and 215 may be set to 3, by which the present disclosure is non-limited. Alternatively, the number of the split bodies 211, 213 and 215 may be set equal to 2 or equal to or greater than 4 to correspond to the number of the blade spaces S2. Yet, for clarity or convenience of the following description, as shown in FIG. 2, the number of each of the blades 130, the blade spaces S2 and the split bodies 211, 213 and 215 is set to 3.

Each of the split bodies 211, 213 and 215 may include a column part molding side 230 (described later) confronting the outer circumferential surface 112 of the column part 110 to partially form the column part space S1. Namely, the column part molding sides 230 of a plurality of the split bodies 211, 213 and 215 may form a single column part space S1 together.

The split bodies 211, 213 and 215 may include a plurality of blade molding sides 250 partially forming the blade space S2. The blade molding side 250 provided to one of the split bodies may form a prescribed blade space S2 together with the blade molding side 250 provided to another split body.

Specifically, a plurality of the split bodies 211, 213 and 215 may include a first split body 211 among a plurality of the split bodies 211, 213 and 215, a second split body 213 neighboring the first split body 211 in one direction C1 of the circumferential direction C of the column part 110, and a third split body 215 neighboring the first split body 211 in the other direction C2 opposite to the one direction C1 of the circumferential direction C of the column part 110.

Namely, the third split body 215 may be located in a manner of neighboring the second split body 213 in the one direction C1 of the circumferential direction C of the column part 110.

The first to third split bodies 211, 213 and 215 may be configured to have the same shapes, respectively and, as described later, assembled to leave no space in between with the same shapes.

Namely, the first to third split bodies 211, 213 and 215 may form a first blade space S2 that is one of a plurality of the blade spaces S2.

The first blade space S2 may be located in a direction where the first split body 211 is configured on the basis of the column part space S1. So to speak, the first blade 130 may be provided to the outer circumferential surface 112 of the column part 110 in the direction where the first split body 211 is configured.

The first to third split bodies 211, 213 and 215 may be configured by being split into 3 bodies along the circumferential direction of the column part 110, and an in-between angle among the split bodies 211, 213 and 215 may include 120 degrees based on the center of the column part 110.

The first to third split bodies 211, 213 and 215 are moved outward along the radial direction D of the column part 110 in the step of extracting the rotating member 100 in the course of injection molding, as described later, and may be prevented from being moved along the length direction V of the column part 110.

Figure 4A:
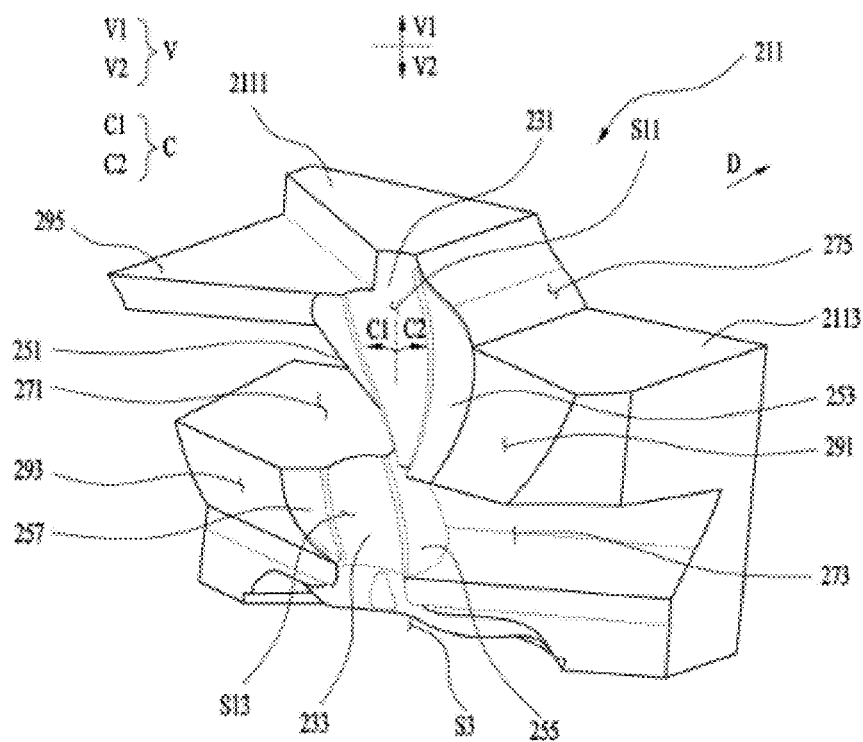
FIGS. 4A and 4B are perspective diagrams showing a first split body in a molding apparatus according to one embodiment of the present disclosure.
Figure 4B:
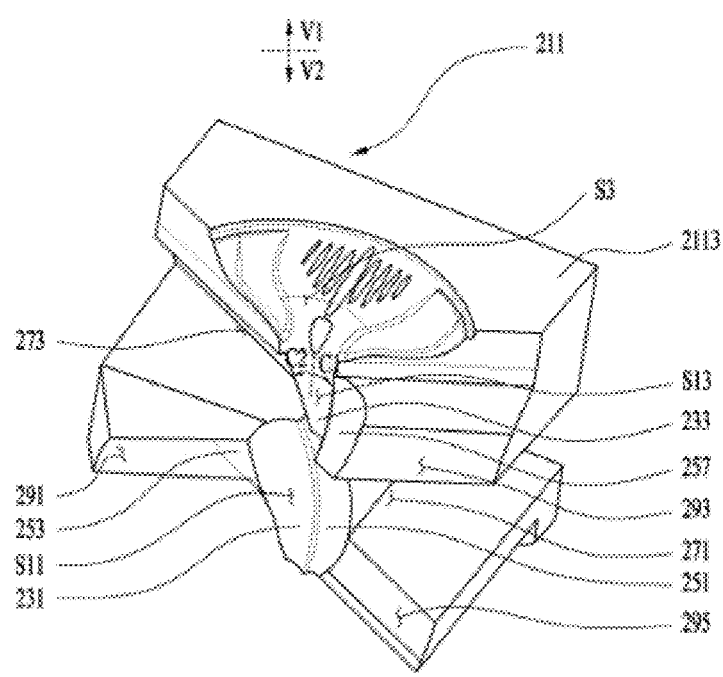

FIGS. 4A and 4B are perspective diagrams showing a first split body in a molding apparatus according to one embodiment of the present disclosure. FIG. 4A is a perspective diagram showing that the first split body 211 shown in FIG. 2 is enlarged to face the first direction V1 corresponding to an extension direction of the column part 110, and FIG. 4B is a perspective diagram showing that an extension direction of the first split body 211 shown in FIG. 4A faces the second direction V2.

The column part molding side 230 may include a first column part molding side 230 forming the other end portion S13 of the column part space S1 and a second column part molding side 230 forming one end portion S11 of the column part space S1.

The first column part molding side 230 forms the other end portion S13 of the column part space S1, whereby a portion of the other end portion 113 of the column part 110 may be molded. The first to third split bodies 211, 213 and 215 include the first column part molding sides 230, respectively. The three first column part molding sides 230 may form the other end portion S13 of the column part space S1 together.

Namely, the first column part molding side 230 of the first split body 211, the first column part molding side 230 of the second split body 213 and the first column part molding side 230 of the third split body 215 may be disposed at intervals of 120 degrees in between based on the center of the column part 110.

Each of the first column part molding side 230 of the first split body 211, the first column part molding side 230 of the second split body 213 and the first column part molding side 230 of the third split body 215 may form a portion of the outer circumferential surface 112 of the column part 110.

The second column part molding side 230 forms one end portion S11 of the column part space S1, whereby a portion of the one end portion 111 of the column part 110 may be molded. Each of the first to third split bodies 211, 213 and 215 may include the second column part molding side 230, and the three second column part molding sides 230 may form the one end portion S11 of the column part space S1 together.

Namely, the second column part molding side 230 of the first split body 211, the second column part molding side 230 of the second split body 213 and the second column part molding side 230 of the third split body 215 may be disposed at intervals of 120 degrees in between based on the center of the column part 110.

Each of the second column part molding side 230 of the first split body 211, the second column part molding side 230 of the second split body 213 and the second column part molding side 230 of the third split body 215 may form a portion of the outer circumferential surface 112 of the column part 110.

So to speak, one outer circumferential surface 112 of the column part 110 may be molded by the first column part molding side 230 and the second column part molding side 230 provided to each of a plurality of the split bodies.

In the following, the first column part molding side 230 and the second column part molding side 230 are described with reference to the first split body 211. Yet, the following description is identically applicable to the first column part molding side 230 and the second column part molding side 230 provided to the second split body 213 or the third split body 215.

In some implementations, the second column part molding side 230 may be connected to the shield mold 300 in the first direction V1 and extended in the second direction V2 so as to be provided to one side of the first split body 211 facing the column part 110.

When the first split body 211 is viewed from the column part 110, the second column part molding side 230 may be extended by being inclined to the one direction C1 to correspond to the inclination direction of the blade 130.

The first column part molding side 230 may be connected to the bottom molding space S3 in the second direction V2 and extended in the first direction V1 so as to be provided to one side of the first split body 211 facing the column part 110.

When the first split body 211 is viewed from the column part 110, the first column part molding side 230 may be extended by being inclined to the one direction C1 to correspond to the inclination direction of the blade 130.

The first column part molding side 230 may not form one side continuous with the second column part molding side 230 depending on the number of turns of the blade 130. Therefore, a parting line P may be formed at a middle point of the column part 110 of the rotating member 100 shown in FIG. 3 in a direction vertical to the length direction V of the column part 110.

In some implementations, the blade molding side 250 of the first split body 211 in the molding apparatus 10 according to one embodiment of the present disclosure may include a first molding side 251 extended from the first column part molding side 230 toward the one direction C1 and a second molding side 253 extended from the first column part molding side 230 toward the other direction C2.

The first molding side 251 may be extended from an outer end portion of the first column part molding side 230, which faces the one direction C1, toward the one direction C1. In addition, the first molding side 251 may be extended from the other end portion S13 of the column part space S1 toward the one end portion S11 of the column part space S1 to correspond to the length direction V of the column part 110.

Likewise, the first molding side 251 may be configured to be extended in a direction corresponding to the extension direction of the first column part molding side 230.

As shown in FIGS. 4A and 4B, the first molding side 251 may be configured to form an inclination angle corresponding to an inclination angle formed to the one direction C1 of the blade 130. In some cases, the other end portion of the first molding side 251 facing the first direction V1 in the first molding side 251 may be provided closer toward the center of the column part 110 than one end portion of the first molding side 251 facing the second direction V2.

On the other hand, the second molding side 253 may be extended from an outer end portion of the first column part molding side 230, which faces the other direction C2, toward the other direction C2. In addition, the second molding side 253 may be extended from the other end portion S13 of the column part space S1 toward the one end portion S11 of the column part space S1 to correspond to the length direction V of the column part 110.

Likewise, the second molding side 253 may be configured to be extended in a direction corresponding to the extension direction of the first column part molding side 230.

As shown in FIGS. 4A and 4B, the second molding side 253 may be configured to correspond to an inclination angle to the one direction C1 of the blade 130. In some cases, the one end portion facing the second direction V2 in the second molding side 253 may be provided closer toward the center of the column part 110 than other end portion facing the first direction V1.

In some implementations, the first molding side 251 of the first split body 211 in the molding apparatus 10 according to one embodiment of the present disclosure may form the other end portion of the first blade space S2 together with the second molding side 253 of the second split body 213.

Since the second split body 213 is located to neighbor the first split body 211 in the one direction C1, the first molding side 251 of the first split body 211 may be extended from the first column part molding side 230 of the first split body 211 toward the second split body 213.

Likewise, since the first split body 211 is located to neighbor the second split body 213 in the other direction C2, the second molding side 253 of the second split body 213 may be extended from the first column part molding side 230 of the second split body 213 toward the first split body 211.

Therefore, while the first and second split bodies 211 and 213 are combined together, the first molding side 251 of the first split body 211 may confront the second molding side 253 of the second split body 213.

The first molding side 251 of the first split body 211 and the second molding side 253 of the second split body 213, which confront each other, may form the other end portion S23a of the first blade space S2 together, and the other end portion 133 of one of the blades 130 may be molded in the other end portion S23a.

Meanwhile, the second molding side 253 of the first split body 211 may form the other end portion of a second blade space S2b (see FIGS. 5A and 5B) different from the first blade space S2 together with the first molding side 251 of the third split body 215.

Since the third split body 215 is located to neighbor the first split body 211 in the other direction C2, the second molding side 253 of the first split body 211 may be extended from the first column part molding side 230 of the first split body 211 toward the third split body 215.

Likewise, since the first split body 211 is located to neighbor the third split body 215 in the one direction C1, the first molding side 251 of the third split body 215 may be extended from the first column part molding side 230 of the third split body 215 toward the first split body 211.

Therefore, while the first and third split bodies 211 and 215 are combined together, the second molding side 253 of the first split body 211 may confront the first molding side 251 of the third split body 215.

The second molding side 253 of the first split body 211 may form the other end portion of the third blade space S2c (see FIGS. 5A and 5B) together with the first molding side 251 of the third split body 215, and the other end portion 133 of one of the blades 130 may be molded in the other end portion.

In some implementations, referring to FIG. 3, each of the first molding side 251 and the second molding side 253 may be extended in the length direction V of the column part 110.

An extended height of each of the first and second molding sides 251 and 253 may be defined as a vertical distance to the other end portion 113 of the column part 110 based on a parting line P provided to a middle portion of the column part 110 between the first column part molding side 230 and the second column part molding side 230.

Namely, an extended height L3 of the first column part molding side 230, the first molding side 251 and the second molding side 253 may correspond to a vertical distance L3 to the other end portion 113 of the column part 110 based on the parting line P provided to the middle portion of the column part 110.

Thus, as shown in FIG. 3, the parting line P provided to the other end portion 113 of the column part 110 and the other end portion 133 of the blade 130 may be formed by the first column part molding side 230, the first molding side 251 and the second molding side 253.

In some implementations, the blade molding side 250 of the first split body 211 in the molding apparatus 10 according to one embodiment of the present disclosure may include a third molding side 255 extended from the second column part molding side 230 toward the other direction C2 and a fourth molding side 257 extended from the second column part molding side 230 toward the one direction C1.

The third molding side 255 may be extended from an outer end portion of the second column part molding side 230, which faces the other direction C2, toward the one direction C1. In addition, the third molding side 255 may be extended from the one end portion S11 of the column part space S1 toward the other end portion S13 of the column part space S1 to correspond to the length direction V of the column part 110.

Likewise, the third molding side 255 may be configured to be extended in a direction corresponding to the extension direction of the second column part molding side 230.

As shown in FIGS. 4A and 4B, the third molding side 253 may be configured to form an inclination angle corresponding to an inclination angle formed to the one direction C1 of the blade 130. In some cases, the one end portion of the third molding side 255 facing the second direction V2 in the third molding side 255 may be provided closer toward the center of the column part 110 than the other end portion of the third molding side 255 facing the first direction V1.

On the other hand, the four molding side 257 may be extended from an outer end portion of the first column part molding side 230, which faces the one direction C1, toward the one direction C1. In addition, the fourth molding side 257 may be extended from the one end portion S11 of the column part space S1 toward the other end portion S13 of the column part space S1 to correspond to the length direction V of the column part 110.

Likewise, the fourth molding side 257 may be configured to be extended in a direction corresponding to the extension direction of the second column part molding side 230.

As shown in FIGS. 4A and 4B, the fourth molding side 257 may be configured to correspond to an inclination angle to the one direction C1 of the blade 130. In some cases, the other end portion facing the first direction V1 in the fourth molding side 257 may be provided closer toward the center of the column part 110 than one end portion facing the second direction V2.

In some implementations, the third molding side 255 of the first split body 211 in the molding apparatus 10 according to one embodiment of the present disclosure may form one end portion of the first blade space S2 together with the fourth molding side 257 of the third split body 215.

Since the third split body 215 is located to neighbor the first split body 211 in the other direction C2, the third molding side 255 of the first split body 211 may be extended from the second column part molding side 230 of the first split body 211 toward the third split body 215.

Likewise, since the first split body 211 is located to neighbor the third split body 215 in the one direction C1, the fourth molding side 257 of the third split body 215 may be extended from the second column part molding side 230 of the third split body 215 toward the first split body 211.

Therefore, while the first and third split bodies 211 and 215 are combined together, the third molding side 253 of the first split body 211 may confront the fourth molding side 257 of the third split body 215.

The third molding side 255 of the first split body 211 and the fourth molding side 257 of the third split body 215, which confront each other, may form the one end portion 521a of the first blade space S2 together, and the other end portion 133 of one of the blades 130 may be molded in the one end portion 521a.

Meanwhile, the fourth molding side 257 of the first split body 211 may form one end portion of the second blade space S2b (see FIGS. 5A and 5B) different from the first blade space S2 together with the third molding side 255 of the second split body 213.

Since the second split body 213 is located to neighbor the first split body 211 in the one direction C1, the fourth molding side 257 of the first split body 211 may be extended from the second column part molding side 230 of the first split body 211 toward the second split body 213.

Likewise, since the first split body 211 is located to neighbor the second split body 213 in the other direction C2, the third molding side 255 of the second split body 213 may be extended from the second column part molding side 230 of the first split body 211 toward the first split body 211.

Therefore, while the first and second split bodies 211 and 213 are combined together, the fourth molding side 257 of the first split body 211 may confront the third molding side 255 of the second split body 213.

The fourth molding side 257 of the first split body 211 may form one end portion of the second blade space S2*b* (see FIGS. 5A and 5B) together with the third molding side 255 of the second split body 213, and one end portion 131 of another one of the blades 130 may be molded in the one end portion.

In some implementations, referring to FIG. 3, each of the third molding side 255 and the fourth molding side 257 may be extended in the length direction V of the column part 110.

An extended height of each of the third and fourth molding sides 255 and 257 may be defined as a vertical distance to the one end portion 111 of the column part 110 based on a parting line P provided to a middle portion of the column part 110 between the first column part molding side 230 and the second column part molding side 230.

Namely, an extended height L4 of the second column part molding side 230, the third molding side 255 and the fourth molding side 257 may correspond to a vertical distance L4 to the one end portion 111 of the column part 110 based on the parting line P provided to the middle portion of the column part 110.

Thus, as shown in FIG. 3, the parting line P provided to the one end portion 111 of the column part 110 and the one end portion 131 of the blade 130 may be formed by the second column part molding side 230, the third molding side 255 and the fourth molding side 257.

Meanwhile, the first split body 211 may include a first receiving part 271 including the first molding side 251 and recessed inward and a first inserting part 291 including the second molding side 253 and protruding outward.

As described above, the first molding side 251 may be configured to form the inclination angle corresponding to the inclination angle A formed to the one direction C1 of the blade 130. In some cases, the other end portion of the first molding side 251 facing the first direction V1 on the first molding side 251 may be configured closer toward the center of the column part 110 than the one end portion of the first molding side 251.

The first receiving part 271 may be configured so that the first column part molding side 230 is disposed between the first receiving part 271 and the first inserting part 291. The first receiving part 271 may be recessed toward the other direction C2 facing the first split body 211 based on the second split body 213. Namely, the first receiving part 271 may be recessed into an outside getting distant from the center of the column part 110 toward the other direction C2.

In addition, one side of the first receiving part 271 facing the second direction V2 may form a surface continuous with the first molding side 251, and may form an inclination angle, which corresponds to the inclination angle A formed to the one direction C1 by the first molding side 251, to the bottom part 150.

The first inserting part 291 may protrude toward the other direction C2 facing the third split body 215 based on the first split body 211.

One side of the first inserting part 291 facing the first direction V1 may form a surface continuous with the second molding side 253, and may form an inclination angle, which corresponds to the inclination angle A formed to the one direction C1 by the second molding side 253, to the bottom part 150.

In addition, an inclination angle formed to the bottom part 150 by one side of the first receiving part 271 facing the second direction V2 may be configured to correspond to the inclination angle formed to the bottom part 150 by the one side of the first inserting part 291 facing the first direction V1.

Therefore, the first inserting part 291 of the second split body 213 may be inserted in the first receiving part 271 of the first split body 211, thereby forming the other end portion S23*a* of the first blade space S2.

In addition, the first inserting part 291 of the first split body 211 may be inserted in the first receiving part 271 of the third split body 215, thereby forming the other end portion of a third blade space S2*c* (see FIGS. 5A and 5B) different from the first blade space S2.

Meanwhile, the first split body 211 may include a second receiving part 273 including the third molding side 255 and recessed inward and a second inserting part 293 including the fourth molding side 257 and protruding outward.

As described above, the third molding side 255 may be configured to form the inclination angle corresponding to the inclination angle A formed to the one direction C1 of the blade 130. In some cases, one end portion of the third molding side 255 facing the second direction V2 on the third molding side 251 may be configured closer toward the center of the column part 110 than the other end portion of the third molding side 255.

The second receiving part 273 may be configured so that the second column part molding side 230 is disposed between the second receiving part 273 and the second inserting part 293. The second receiving part 273 may be recessed toward the one direction C1 facing the first split body 211 based on the third split body 215.

Namely, the second receiving part 273 may be recessed into an outside getting distant from the center of the column part 110 toward the one direction C1. The second receiving part 273 may be configured in a manner of being recessed in the one direction C1 facing the first split body 211 based on the third split body 215.

In addition, one side of the second receiving part 273 facing the first direction V1 may form a surface continuous with the third molding side 255, and may form an inclination angle, which corresponds to the inclination angle A formed to the one direction C1 by the third molding side 255, to the bottom part 150.

The second inserting part 293 may protrude toward the one direction C1 facing the second split body 213 based on the first split body 211.

One side of the second inserting part 293 facing the second direction V2 may form a surface continuous with the fourth molding side 257, and may form an inclination angle, which corresponds to the inclination angle A formed to the one direction C1 by the fourth molding side 257, to the bottom part 150.

In addition, an inclination angle formed to the bottom part 150 by one side of the second receiving part 273 facing the first direction V1 may be configured to correspond to the inclination angle formed to the bottom part 150 by the one side of the second inserting part 293 facing the second direction V2.

Therefore, the second inserting part 293 of the third split body 215 may be inserted in the second receiving part 273 of the first split body 211, thereby forming the one end portion of the first blade space S2.

In addition, the second inserting part 293 of the first split body 211 may be inserted in the second receiving part 273 of the second split body 213, thereby forming the one end portion of a second blade space S2b (see FIGS. 5A and 5B) different from the first blade space S2.

In some implementations, referring to FIG. 3, the blade 130 of the rotating member 100 molded in the molding apparatus 10 according to one embodiment of the present disclosure may include one side 135 having at least one portion facing the first direction V1 and the other side 137 located on an opposite side of the one side 135 and having at least one portion facing the second direction V2.

According to one embodiment of the present disclosure, when the column part 110 is viewed in the second direction V2, the one side 135 may be connected by forming an obtuse angle to the outer circumferential surface 112 of the column part 110 and the other side 137 may be connected by forming an acute angle thereto.

Specifically, the blade 130 may be configured in a manner of protruding from the outer circumferential surface 112 of the column part 110 toward an outside of the column part 110 and have one side 135 and the other side 137. According to one embodiment of the present disclosure, the one side 135 of the blade 130 may be understood as having at least one portion that is a surface facing the first direction V1, and the other side 137 of the blade 130 may be understood as having at least one portion that is a surface facing the second direction V2.

Namely, as shown in FIG. 3, in case that the blade 130 is extended in a manner of being inclined in one direction C1 of the circumferential direction C of the column part 110, the one side 135 of the blade 130 may correspond to a surface facing the other direction C2 of the circumferential direction C of the column part 110 and the other side 137 of the blade 130 my correspond to a surface facing the one direction C1 of the circumferential direction C of the column part 110.

Referring to FIGS. 4A and 4B, in the molding apparatus 10 according to one embodiment of the present disclosure, the first molding side 251 of the first split body 211 may mold the one side 135 of a prescribed blade 130 together with the fourth molding side 257 of the third split body 215.

For example, the first molding side 251 of the first split body 211 may mold the one side 135 of a prescribed blade 130 molded in the first blade space S2 together with the fourth molding side 257 of the third split body 215.

Moreover, in the molding apparatus 10 according to one embodiment of the present disclosure, the third molding side 255 of the first split body 211 may mold the other side 137 of the prescribed blade 130 together with the second molding side 253 of the second split body 213.

For example, the third molding side 255 of the first split body 211 may mold the other side 137 of a prescribed blade 130 molded in the first blade space S2 together with the second molding side 237 of the second split body 213.

Namely, in FIG. 3, the parting line P provided to the one side 135 of the one end portion 131 of the blade 130 may be molded by both of the second molding side 253 of the first split body 211 and the first molding side 251 of the third split body 215.

On the other hand, the parting line P provided to the other side 137 of the one end portion 131 of the blade 130 may be molded by both of the first molding side 251 of the first split body 211 and the second molding side 253 of the second split body 213.

In FIG. 3, the parting line P provided to the one side 135 of the other end portion 133 of the blade 130 may be molded by both of the third molding side 255 of the first split body 211 and the fourth molding side 257 of the third split body 215.

On the other hand, the parting line P provided to the other side 137 of the other end portion 133 of the blade 130 may be molded by both of the fourth molding side 257 of the first split body 211 and the third molding side 255 of the second split body 213.

Meanwhile, the first split body 211 may include a third inserting part 295 located in the first direction V1 at the first receiving part 271 and protruding outward toward the second split body 213.

In addition, the first split body 211 may include a third receiving part 275 located in the first direction V1 at the first inserting part 291, configured toward the third split body 215, and recessed inward.

The third inserting part 295 of the first split body 211 is inserted in the third receiving part 275 of the second split body 213, and one side facing the second direction V2 in the third inserting part 295 of the first split body 211 may contact with a side 2113 facing the first direction V1 in the third receiving part 275 of the second split body 213 so as to be connected thereto.

In addition, the third receiving part 275 of the first split body 211 receives the third inserting part 295 of the third split body 215, and the side 2113 facing the first direction V1 in the third receiving part 275 of the second split body 213 may contact with the one side facing the second direction V2 in the third inserting part 295 of the second split body 213 so as to be connected thereto.

Figure 5A:
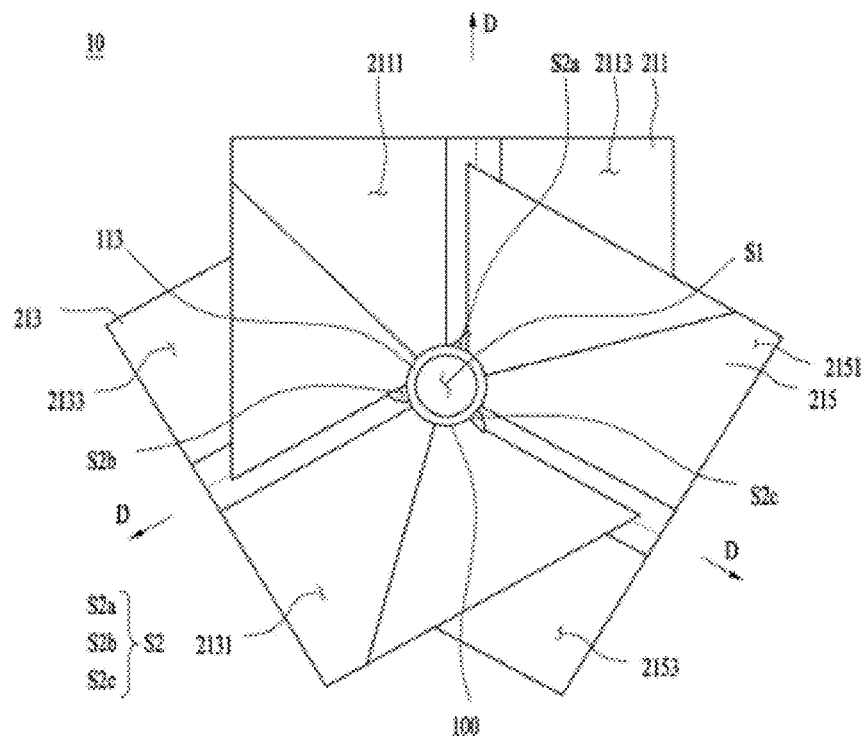
FIGS. 5A and 5B are diagrams of a main mold in a molding apparatus according to one embodiment of the present disclosure, viewed from a shield mold.
Figure 5B:
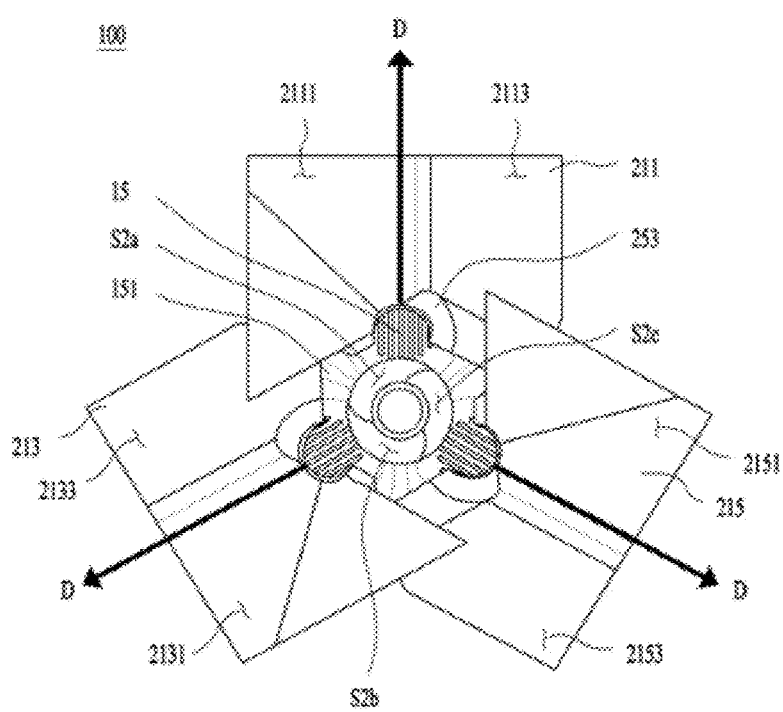

FIGS. 5A and 5B are diagrams of a main mold in a molding apparatus according to one embodiment of the present disclosure, viewed from a shield mold. The description redundant with the aforementioned structure will be omitted from the following description.

FIG. 5A is a diagram showing the main mold viewed in the second direction V2 before a plurality of the split bodies are separated from each other in the molding apparatus according to one embodiment of the present disclosure. FIG. 5B is a diagram showing the main mold viewed in the second direction V2 after a plurality of the split bodies have been separated from each other in the molding apparatus according to one embodiment of the present disclosure.

While the first to third split bodies 211, 213 and 215 are combined together, the main mold 200 is configured to enable an injection liquid to flow into the column part space S1 and the blade space S2.

The first blade space S2 may be located closest to the first split body 211 among a plurality of the split bodies based on the center of the column part space S1.

The second blade space S2 may be located closest to the second split body 213 among a plurality of the split bodies based on the center of the column part space S1.

And, the third blade space S2 may be located closest to the third split body 215 among a plurality of the split bodies based on the center of the column part space S1.

After the injection liquid has flown in, if the molding of the rotating member 100 is completed, the first to third split bodies 211, 213 and 215 are separated from each other and move in the radial direction D of the column part 110.

A moving distance of the column part 110 may be set to a distance enough for the rotating member 100 to be extracted from the molding apparatus 10.

The first blade space S2, the second blade space S2 and the third blade space S2 may be formed by the first split body 211, the second split body 213 and the third split body 215, respectively.

Figure 6A:
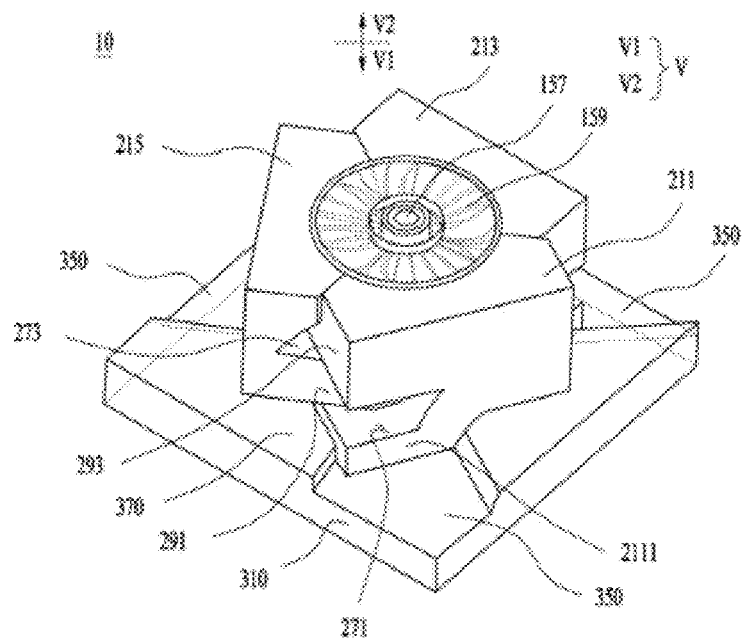
FIGS. 6A and 6B are perspective diagrams showing a main mold and a shield mold in a molding apparatus according to one embodiment of the present disclosure.
Figure 6B:
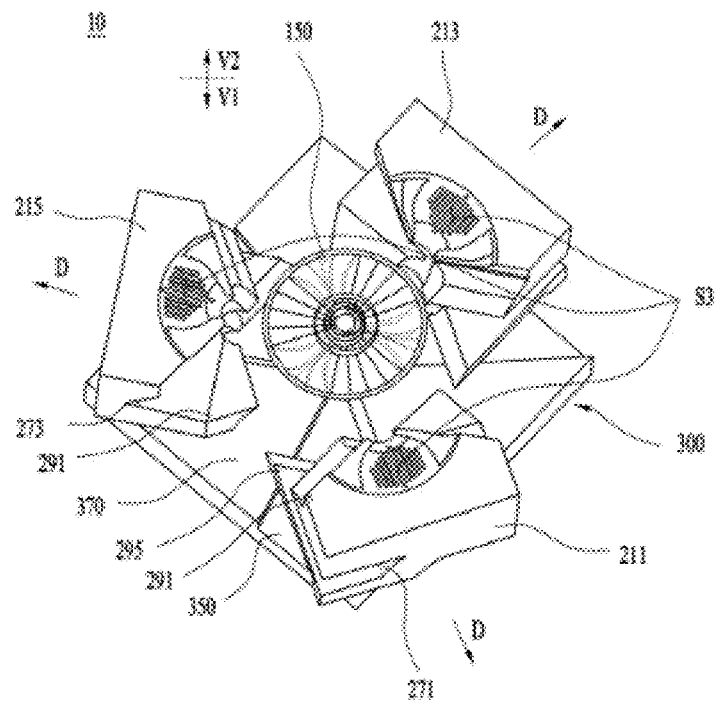
Figure 7:
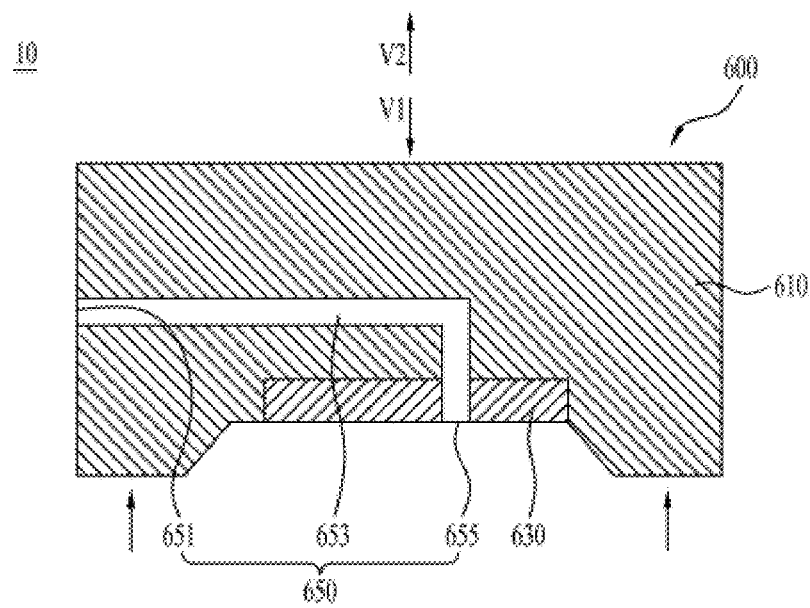
FIG. 7 is a cross-sectional diagram showing a molding apparatus according to one embodiment of the present disclosure.
Figure 7:
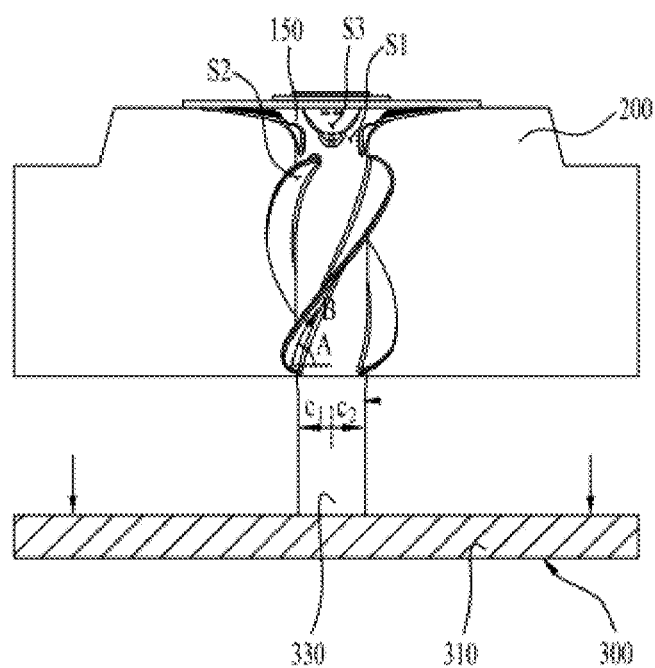

FIGS. 6A and 6B are perspective diagrams showing a main mold and a shield mold in a molding apparatus according to one embodiment of the present disclosure. FIG. 7 is a cross-sectional diagram showing a molding apparatus according to one embodiment of the present disclosure. Particularly, FIG. 7 is a cross-sectional diagram showing that the pressurizing mold 600 is spaced apart from the split bodies 211, 213 and 215 after completion of cooling or hardening of the rotating member 100.

The description redundant with the aforementioned structure will be omitted from the following description.

Referring to FIGS. 6A to 7, the molding apparatus 10 according to one embodiment of the present disclosure may include a shield mold 300 shielding the column part space S1 by being connected to the split bodies 211, 213 and 215 on the side of the other end portion 113 of the column part 110. The shield mold 300 may include a hollow molding pin 330 inserted into the column part space S1 to mold the column part 110 into a hollow shape.

A width of the shield mold 300 may be set greater than that of the main mold 200. The shield mold 300 may be positioned over the main mold 200 in the first direction V1 and then connected to the main mold 200.

The hollow molding pin 330 of the shield mold 300 may be extended into the column part space S1 from one side confronting the main mold 200 so as to mold the column part 110 into the hollow shape.

The extension length of the hollow molding pin 330 may be set smaller than the height L1 of the rotating member and correspond to the extended height L2 of the blade 130.

A diameter of the hollow molding pin 330 may be set smaller than that of the outer circumferential surface of the column part 110, and the hollow molding pin 330 may form one side confronting the inner circumferential surface of the column part 110 to mold the column part 110.

One end portion of the hollow molding pin 330 facing the second direction V2 may be configured to contact with the bottom part 150 and form one side for molding a portion of the bottom part 150.

The hollow molding pin 330 may be configured in a manner that a diameter of the outer circumferential surface gradually decreases toward the bottom part 150. Thus, after completion of the molding of the rotating member 100, the movement of the shield mold 300 in the first direction V1 is facilitated in the course of extraction.

As the diameter of the outer circumferential surface of the hollow molding pin 330 gradually decreases toward the bottom part 150, a diameter of an outer circumferential surface of the column part 110 may decrease gradually toward the bottom part 150 as well.

An extension line heading for the bottom part 150 from the center of the hollow molding pin 330 may pass through the center of the column part 110. The outer circumferential surface of the hollow molding pin 330 directly contacts with the injection liquid and may be formed of material of high thermal durability.

In some implementations, referring to FIGS. 6A and 6B, the shield mold 300 in the molding apparatus 100 according to one embodiment of the present disclosure may include a guide recess 350 formed on one side confronting each of the split bodies 211, 213 and 215, extended in a direction getting distant from the hollow molding pin 330, and enabling at least one portion of each of the split bodies 211, 213 and 215 to be slidably received therein.

The guide recess 350 may be formed in a manner that the one side of the shield mold 300 confronting each of the split bodies 211, 213 and 215 is recessed toward the first direction V1. Referring to FIGS. 4A and 4B, the first split body 211 may include a guide protrusion part 2111 protruding from the third inserting part 295 toward the first direction vl.

After the molding of the rotating member 100 has been completed, the guide recess 350 may receive the guide protrusion part 2111 therein in the course of moving the first to third split bodies 211, 213 and 215 in the radial direction D of the column part 110 and the first to third split bodies 211, 213 and 215 may be guided in the radial direction D of the column part 110 by the guide recess 350.

In this case, the third inserting part 295 and the third receiving part 275 of the first split body 211 may be configured to slidably contact with one side of the shield mold 300.

In some implementations, the rotating member 100 molded by the molding apparatus 10 according to one embodiment of the present disclosure may include the bottom part 150 connected to the one end portion 111 of the column part 110 and having a diameter greater than that of the column part 110.

On the other hand, the split bodies 211, 213 and 215 may include a bottom molding space S3 formed next to the bottom part 150 and configured to communicate with the column part space S1 and mold the bottom part 150 therein.

Referring to FIG. 3, a height L5 of the bottom part 150 may be defined as a vertical distance from the bottom part 150 to the one end portion 111 of the column part 110. A single bottom molding space S3 may be formed by the first to third split bodies 211, 213 and 215. A height of one end portion of the second column molding side 233 facing the second direction V2 may be configured to correspond to the height L5 of the bottom part 150 as well.

The number of the main protrusion parts 151 of the bottom part 150 may be set to the number corresponding to the number of the split bodies, and the parting line P generated from the bottom part 150 may be provided to one side of each of the main protrusion parts 151.

The first split body 211 may be configured to mold a portion of a prescribed one of a plurality of the main protrusion parts 151 or a portion of another one of them.

The first split body 211 may be located in a direction that the first sub-protrusion part 153 faces the radial direction D of the column part 110 based on the column part 110, and the number of the first sub-protrusion parts 153 may be set to correspond to the number of the split bodies 211, 213 and 215.

Meanwhile, referring to FIGS. 6A and 6B, in the molding apparatus 10 according to one embodiment of the present disclosure, the rotating member 100 may be provided with a shaft coupling part 157 for coupling a rotating shaft (not shown) to the bottom part 150. Particularly, the rotating shaft may mean a member that provides rotation power to the rotating member 100.

For example, in case that the rotating member 100 is provided to a washer for washing laundry, a rotating shaft or the like is coupled to the rotating member 100 and rotation power may be provided to rotate the rotating member 100 in the circumferential direction C of the column part 110. In this case, the rotating member 100 may be used as a member for agitating water and laundry in the washer.

As the center of the shaft coupling part 157 is aligned with the center of the column part 110 and the center of the bottom part 150, when the rotating member 100 is rotating, eccentric rotation can be avoided and vibration and noise can be minimized.

The shaft coupling part 157 may be molded in the bottom molding space S3 or a separate mold other than the molding apparatus 10 and then coupled after completion of the molding of the rotating member 100. The shaft coupling part 157 may be provided to one side of the bottom part 150 facing the second direction.

In addition, the shaft coupling part 157 may include a plurality of gears (not shown) protruding along a circumference of an outer circumferential surface toward a radial direction. The gears (not shown) are engaged with the rotating shaft, whereby power can be provided to the rotating member 100.

Meanwhile, referring to FIGS. 6A and 6B, according to one embodiment of the present disclosure, the bottom part 150 may be provided with a reinforcing part 159 protruding from one side of the bottom part 150, which faces the second direction V2, toward the second direction V2. The reinforcing part 159 may be extended along a circumferential direction of the bottom part 150 or a radial direction, thereby improving the rigidity of the bottom part 150.

In some implementations, referring to FIG. 7, the molding apparatus 10 according to one embodiment of the present disclosure may include a pressurizing mold 600 connected to the main mold 200 in the second direction V2 to shield one side of the bottom molding space S3.

The bottom molding space S3 of the split bodies 211, 213 and 215 may be configured to communicate externally in a manner that one side facing the second direction V2 is open. The pressurizing mold 600 shields one side of the bottom molding space S3 so that one side of the bottom part 150 facing the second direction V2 can be molded.

The pressurizing mold 600 may include an inlet part 650 for injecting the injection liquid into the bottom molding space S3. The pressurizing mold 600 may guide the injection liquid into the column part space S1 and the blade space S2 located within the main mold 200 while contacting with a plurality of the split bodies 211, 213 and 215.

The pressurizing mold 600 may include a first pressurizing mold 610 forming an exterior and a second pressurizing mold 630 shielding the bottom molding space S3 of the main mold 200 by being provided to one side on which the first pressurizing mold 610 confronts the bottom molding space S3.

The second pressurizing mold 630 may be configured to correspond to a shape of one side of the bottom part 150 facing the second direction V2, and the inlet part 650 (described later) may pass through the second pressurizing mold 630 so as to guide the injection liquid to the bottom molding space S3.

The inlet part 650 may include an inlet hole 651 formed by perforating an outer surface of the first pressurizing mold 610 to enable the injection liquid to flow into the pressurizing mold 600 from outside, a guide hole 655 formed by perforating the second pressurizing mold 630 to guide the injection fluid to the bottom molding space S3, and a moving flow path 653 formed by perforating the first pressurizing mold 610 to make the inlet hole 651 and the guide hole 655 communicate with each other.

The injection liquid may enter the inlet hole 651 and then flow into the bottom molding space S3, the column part space S1 and the blade space S2 through the moving flow path 653 and the guide hole 655.

The guide hole 655 may be located to confront a location of the main protrusion part 151 of the bottom part 150. Thus, after the molding has been completed via injection of the injection liquid, when the pressurizing mold 600 is spaced apart from the main mold 200, the damage caused to the rotating member 100 can be minimized.

Meanwhile, an operating process of the molding apparatus 10 according to one embodiment of the present disclosure is described with reference to FIGS. 6A to 7. First of all, the main mold 200 is connected to the pressurizing mold 600 in the second direction V2 and the shield mold 300 in the first direction V1, whereby the injection liquid may flow into the column part space S1, the blade molding space S2 and the bottom molding space S3 through the inlet part 650.

The hollow molding pin 330 of the shield mold 300 may form the column part space S1 together with the first to third split bodies 211, 213 and 215. If the injection liquid flows into the column part space S1, the column part 110 may be molded.

In addition, the injection liquid flows into the column part space S1, the blade molding space S2 and the bottom molding space S3 and the molding of the rotating member 100 can be then completed.

Once the molding of the rotating member 100 is completed, the pressurizing mold 600 is moved in the second direction V2 to get distant from the main mold 200 and then spaced apart from the main mold 200.

In addition, as shown in FIGS. 6A and 6B, the first to third split bodies 211, 213 and 215 may be oved in the radial direction of the column part 110.

The third inserting part 295 of each of the first to third split bodies 211, 213 and 215 is inserted in the guide recess 350 of the shield mold 300 and then moved along an extension direction of the guide recess 350. As shown in FIG. 6B, the first to third split bodies 211, 213 and 215 may be then spaced apart from the rotating member 100.

After the first to third split bodies 211, 213 and 215 have been spaced apart from the rotating member 100, the shield mold 300 may be moved in the first direction V1 and then spaced apart from the rotating member 100.

The hollow molding pin 330 molds the inner circumferential surface of the column part 110, moves in the first direction V1 within the column part 110 of the rotating member 100, and may be then spaced apart from the inner circumferential surface of the column part 110.

An outer diameter of the other end portion 113 of the column part 110 may be formed greater than that of one end portion (not shown) of the hollow molding pin 330 facing the second direction V2, whereby the rotating member 100 can be extracted while a portion of the hollow molding pin 330 is still located within the rotating member 100.

After the rotating member 100 has been spaced apart from the molding apparatus 10, an out-mold cooling process for cooling down the rotating member 100 at room temperature outside the molding apparatus 10 may be performed. Although the cooling or hardening process is performed on the rotating member 100 within the molding apparatus 10, since an internal temperature of the main mold 200 is higher than the room temperature, a residual thermal stress may be still generated under a surface of the rotating member 100.

In addition, since the residual thermal stress may be generated under the surface of the rotating member 100 after completion of the extraction of the rotating member 100, out-mold cooling may be performed on the rotation member 100 exposed at room temperature.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for molding a rotating member including (i) a column part that extends from a first end portion toward a second end portion and (ii) a plurality of blades that are disposed at an outer circumferential surface of the column part and that are extended and being inclined to a first direction of a circumferential direction of the column part, the apparatus comprising:
a main mold including (i) a column part space configured to mold the column part therein and (ii) a plurality of blade spaces configured to mold the plurality of blades therein,
wherein the main mold further comprises:
a plurality of split bodies that are disposed along the circumferential direction of the column part and that are configured to move along a radial direction of the column part,
wherein each of the plurality of split bodies comprises:
a column part molding surface defining the column part space, and
a plurality of blade molding surfaces defining the blade space,
wherein column part molding surfaces of the plurality of the split bodies define the column part space together,
wherein a first blade molding surface provided at one of the plurality of split bodies defines, together with a second blade molding surface provided at another one of the plurality of split bodies, one of the plurality of blade spaces,
wherein a number of the plurality of the split bodies corresponds to a number of the plurality of blade spaces,
wherein the plurality of the split bodies comprises:
a first split body,
a second split body disposed adjacent to the first split body in the first direction, and
a third split body disposed adjacent to the first split body in a second direction opposite to the first direction,
wherein the plurality of the blade spaces comprise a first blade space, and
wherein blade molding surfaces of the first split body, the second split body, and the third split body define the first blade space.

2. The apparatus of claim 1, wherein each of the column part molding surfaces comprises:
a first column molding surface defining a second end portion of the column part space that is configured to mold the second end portion of the column part, and
a second column molding surface defining a first end portion of the column part space that is configured to mold the first end portion of the column part.

3. The apparatus of claim 2,
wherein a first end portion of each of the plurality of blade spaces is configured to mold a first end portion of the blade,
wherein a second end portion of each of the plurality of blade spaces is configured to mold a second end portion of the blade,
wherein each of the plurality of blade molding surfaces comprises a first molding surface extended from the first column molding surface in the first direction and a second molding surface extended from the first column molding surface in the second direction, and
wherein the first molding surface of the first split body defines a second end portion of the first blade space with the second molding surface of the second split body.

4. The apparatus of claim 3, wherein each of the plurality of blade molding surfaces further comprises:
a third molding surface extended from the second column molding surface in the second direction; and
a fourth molding surface extended from the second column molding surface in the first direction,
wherein the third molding surface of the first split body defines a first end portion of the first blade space together with the fourth molding surface of the third split body.

5. The apparatus of claim 4, wherein the first molding surface of the first split body defines a first surface of the blade with the fourth molding surface of the third split body, and
wherein the third molding surface of the first split body is configured to mold a second surface of the blade together with the second molding surface of the second split body.

6. The apparatus of claim 4, wherein the plurality of split bodies further comprise:
a first receiving part that is recessed inward and that includes the first molding surface; and
a first inserting part that protrudes outward and that includes the second molding surface,
wherein the first inserting part of the second split body is inserted to the first receiving part of the first split body to define the second end portion of the first blade space.

7. The apparatus of claim 6, wherein the plurality of split bodies further comprise:
a second receiving part that is recessed inward and that includes the third molding surface; and
a second inserting part that protrudes outward and that includes the fourth molding surface,
wherein the second inserting part of the third split body is inserted to the second receiving part of the first split body to define the first end portion of the first blade space.

8. The apparatus of claim 1, further comprising:
a shield mold connected to the plurality of split bodies on the second end portion of the column part to shield the column part space, and
wherein the shield mold comprises a hollow molding pin inserted into the column part space to mold the column part into a hollow shape.

9. The apparatus of claim 8, wherein the shield mold further comprises a guide recess that is provided at a first surface facing the plurality of split bodies in the shield mold, that extends away from the hollow molding pin, and that is configured to receive a portion of the plurality of split bodies.

10. The apparatus of claim 8, wherein a width of the shield mold is greater than a width of the main mold.

11. The apparatus of claim 8, wherein a diameter of the hollow molding pin is less than a height of the rotating member.

12. The apparatus of claim 8, wherein a diameter of an outer circumferential surface of the hollow molding pin decreases toward a bottom part of the rotating member.

13. The apparatus of claim 1, wherein the rotating member further comprises a bottom part connected to the first end portion of the column part and having a diameter greater than a diameter of the column part, and wherein the main mold comprises a bottom molding space that is defined at the bottom part and that is in communication with the column part space and configured to mold the bottom part.

14. The apparatus of claim 13, wherein a first side of the bottom molding space defines an opening, and wherein the apparatus further comprises a pressurizing mold that is configured to, based on being coupled to the main mold, shield a first side of the bottom molding space and that includes an inlet part configured to inject an injection liquid into the bottom molding space.

15. The apparatus of claim 14, wherein a diameter of an outer circumferential surface of the column part decreases toward the bottom part of the rotating member.

16. The apparatus of claim 14, wherein the inlet part includes an inlet hole that is configured to allow the injection liquid to flow into the pressurizing mold.

17. The apparatus of claim 16, wherein the inlet part further includes a guide hole that is configured to guide the injection liquid to the bottom molding space.

18. The apparatus of claim 17, wherein the inlet part further includes a moving flow path that is in communication with the inlet hole and the guide hole.

* * * * *